P. E. TANNER.
GAGE FOR LIQUID CONTAINING TANKS.
APPLICATION FILED JUNE 18, 1914.
1,129,837.
Patented Feb. 23, 1915.
2 SHEETS—SHEET 1.
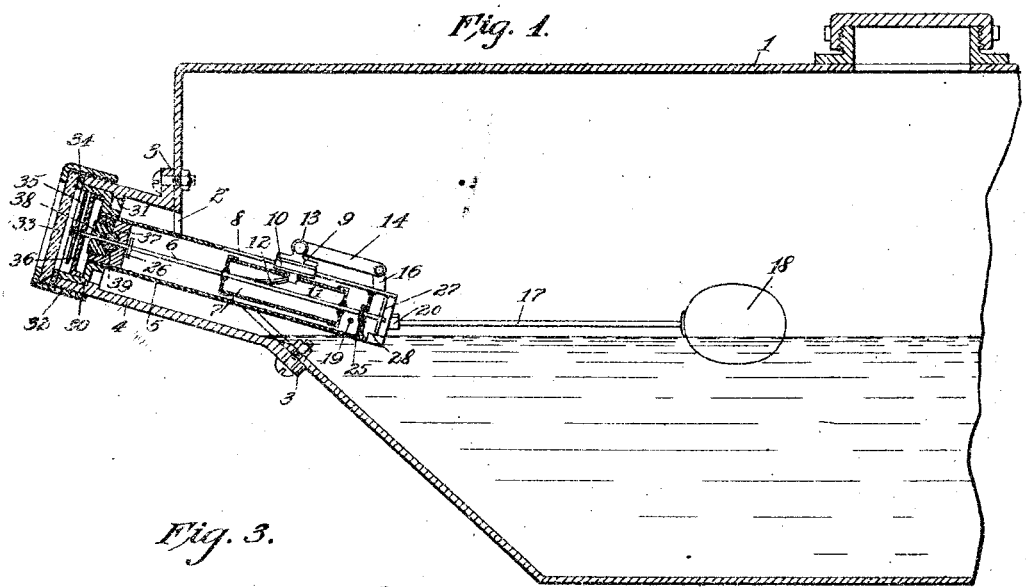
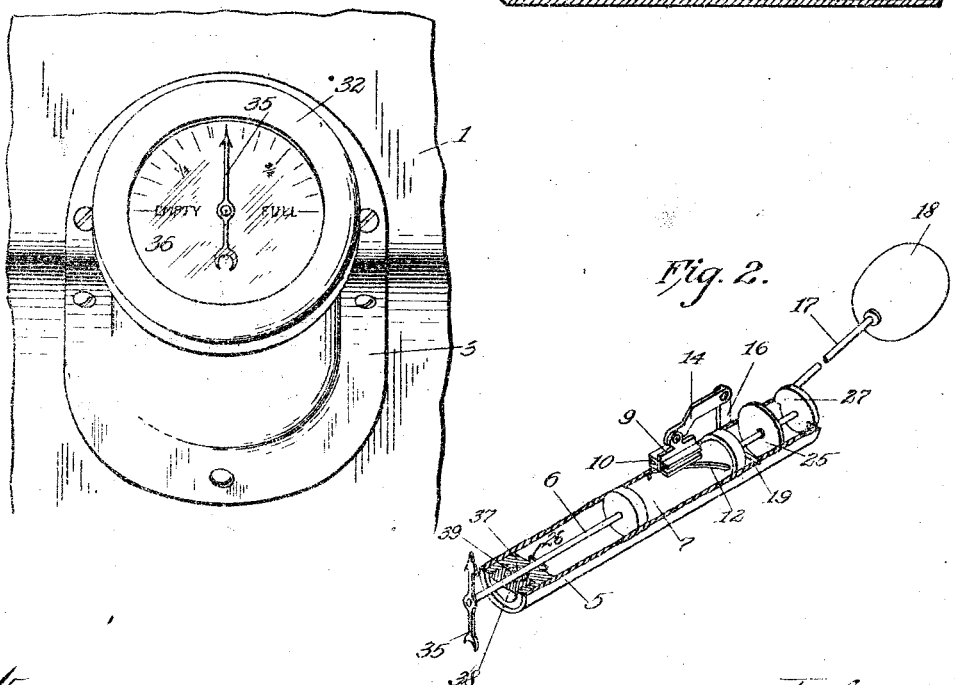
Witnesses:
R. L. Bruck.
H. O. McGill.
Inventor,
Perry E. Tanner
By Hull & Smith
Attys.

P. E. TANNER.
GAGE FOR LIQUID CONTAINING TANKS.
APPLICATION FILED JUNE 18, 1914.
1,129,837.
Patented Feb. 23, 1915.
2 SHEETS—SHEET 2.
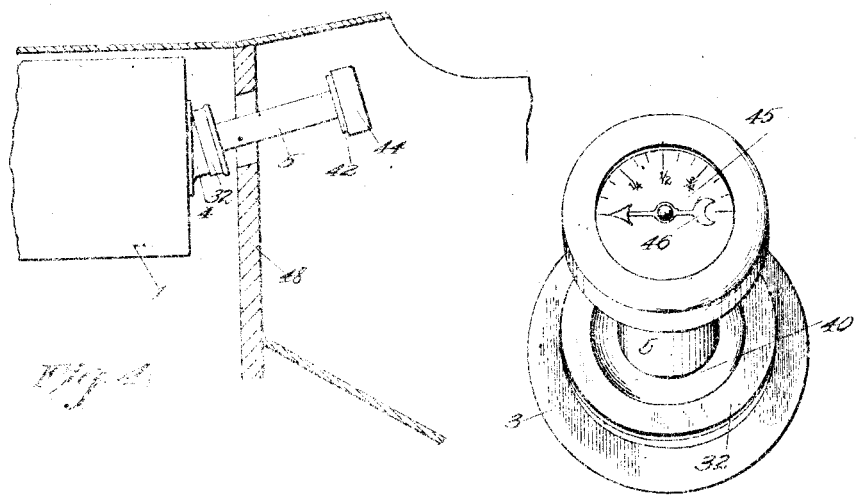
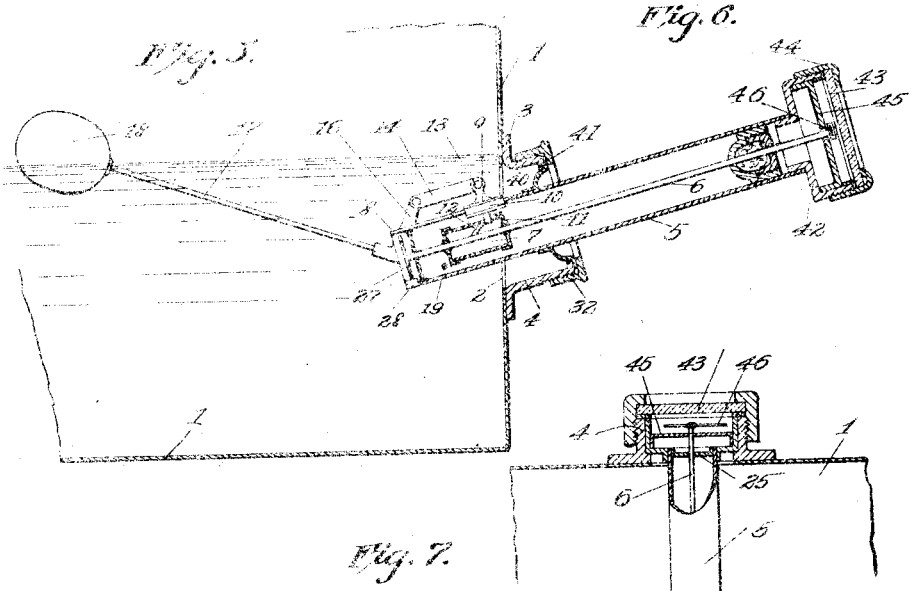
Witnesses:
R. L. Bruck
H. B. McGill
Inventor,
Perry E. Tanner
By Hull & Smith
Attys

UNITED STATES PATENT OFFICE.

PERRY E. TANNER, OF AKRON, OHIO.

GAGE FOR LIQUID-CONTAINING TANKS.

1,129,837.   Specification of Letters Patent.   Patented Feb. 23, 1915.

Application filed June 18, 1914. Serial No. 845,778.

*To all whom it may concern:*

Be it known that I, PERRY E. TANNER, a citizen of the United States, residing at Akron, in the county of Summit and State of Ohio, have invented a certain new and useful Improvement in Gages for Liquid-Containing Tanks, of which the following is a full, clear, and exact description, reference being had to the accompanying drawings.

This invention relates to measuring devices whereby the height of liquid in a closed tank may be indicated upon a dial exteriorly of the tank, and the objects of the invention are the provision of a device of this character wherein the dial can be adjusted at any angle to the horizontal or located in any desired position relative to the side of the tank and this without any change whatever in the construction of the indicating mechanism; the provision of means for preventing leakage past the indicator spindle; the provision of a device of this character in which the indicating dial may be located at any convenient distance from the tank and without any change in the construction of the operating mechanism; the provision of a device of this character of great simplicity, reliability and cheapness; while further objects and advantages of the invention will appear as the description proceeds.

Generally speaking my invention may be defined as consisting of the combinations and constructions recited in the claims hereto annexed and illustrated, in one embodiment, in the drawings accompanying and forming a part of this application wherein:

Figure 1 is a vertical, cross-sectional view through a liquid containing tank equipped with a gage of my invention; Fig. 2 is a perspective view of the operating mechanism of the said gage, a portion of the same being broken away so as to show the interior construction; Fig. 3 is a face view of the gage dial and tank fitting; Fig. 4 represents a side elevation of the same gage arranged with its dial at a distance from the tank wall; Fig. 5 is a vertical longitudinal cross-sectional view taken through the parts shown in Fig. 4; Fig. 6 is a face view of the gage dial shown in Fig. 5; and Fig. 7 represents a side elevation of the same gage arranged in vertical position inside a liquid containing tank.

Describing the parts by reference characters 1 represents a liquid containing tank which may be of any desired material, size, use or capacity, but it is here illustrated as the fuel tank of a vehicle in which connection my invention finds its broadest, but not its exclusive use. Formed in the tank at any suitable or desired location is an opening 2 about which is secured the shoulder 3 of a neck 4, said shoulder being made of any convenient shape as may be necessary to conform to the exterior of the tank. Mounted inside of this neck and preferably coaxial therewith is a hollow tube 5 having journaled therein a rotatable spindle 6 provided at a point between its ends with a cylindrical drum 7. Formed in the side of the tube 5 adjacent to this drum is a longitudinal slot 8 in which is slidably mounted a rider or crosshead 9 having its side edges formed with grooves 10—10 which embrace and run along the edges of the slot 8. The inner face of this crosshead or rider carries a finger 11 which projects into a helical slot 12 formed in the wall of the drum 7 while the outer side of the same is provided with an extension 13 pivotally connected to a link 14 the other end of which is connected to an arm 16 projecting laterally from the stem 17 of a float 18, which stem is pivoted to the tube 5 by having its end bent at a right angle as at 19 and projected through the walls of the tube. In the present embodiment the lever 16 is shown as having a T-shaped end 20 which is folded around the stem 17 and soldered thereto.

The spindle 6 is journaled within the tube 5 by being passed through apertures formed in plates 25—25 carried thereby, while longitudinal movement of the spindle is prevented by collars or washers 26 rigidly secured thereto and abutting against the plates. The rotation of the spindle is limited in any convenient manner as by means of the shouldered disk 27 secured to the inner end thereof and coöperating with a stop 28 carried by the tube and preferably made by slitting either the tube wall or the plate 25 and bending inwardly a portion of the metal so as to form a narrow tongue.

In Figs. 1 and 3 I have shown the tube 5 as retained in position by being secured in the apertured bottom of a cup-shaped device 30 fitting snugly into the neck 4 and abutting against a suitable shoulder 31 formed in the interior thereof. Any one of many means may be employed for securing this cup in place, preferably that of clamping it against the shoulder by means of the gland 32 which presses upon it through the medium of the crystal 33 and gasket 34, thus preventing all leakage. The end of the spindle is provided with the pointer 35 which plays over the dial plate 36 which is mounted within the cup 30. When the gage is used at or near horizontal position as shown in Figs. 1 and 5, it is necessary to employ means to prevent the liquid in the tank from leaking through the tube 5 and flooding the dial. For this purpose I have shown in Figs. 1 and 2 a packing box 37 located in the tube and having a screw cover 38, the two being hollowed out to form a cavity 39 through which the spindle 6 passes. This cavity is filled with some viscous packing material not acted upon by the tank liquid. While I do not limit myself to any particular material I have found that a fairly soft soap operates very satisfactorily in connection with gasolene tanks.

In Figs. 4 to 6 I have shown the tube 5 as retained in position by means of a collar 40 made of comparatively thin and ductile metal such as copper and secured to the tube in any convenient manner as by soldering. The peripheral portion of this collar is formed as a flat flange 41 adapted to be compressed between the end of the neck 4 and the flange of the gland 32. In this case the end of the tube 5 is provided with a hollow head 42 closed by means of the crystal 43 and gland 44 and containing the dial 45 and pointer 46. It will be apparent that the tube 5 can be adjusted longitudinally merely by securing the collar 40 at the proper location. Also, in case the collar 40 be made sufficiently flexible, the tube 5 can be deflected to one side or the other sufficiently to accommodate minor variations in installation. This form is frequently useful in connection with the oil tanks of automobiles where the instrument board 48 is at a distance from the tank or it is desired to set the dial at a distance therefrom to get better light or access as shown in Fig. 4.

If it be desired to locate this gage in an upright position with its dial horizontal it is merely necessary to secure the same in a suitable opening in the tank and to bend the stem 17 of the float as illustrated in Fig. 7. This arrangement of parts permits the dial to be located in any direction, in any position, and at any desired distance from the tank.

It will also be understood that a great many changes in point of detail, construction, arrangement, and form could be made within the purview of my invention wherefore I do not limit myself to the details herein disclosed except as the same are specifically recited in the claims hereto annexed or rendered necessary by the prior state of the art.

Having thus described my invention, what I claim is:—

1. In a gage for liquid containing tanks, the combination, with a tubular neck secured to the tank wall, and a crystal closing the end of said neck, of a rigid support secured in said neck, a rotatable shaft journaled in said support, a movable indicating member carried by the outer end of said shaft, a fixed indicating member carried by said neck, a stem pivoted to said support upon a substantially horizontal axis, said pivot being transverse to said spindle, a reciprocable member carried by said support, means connecting said reciprocable member and stem and adapted to move said member along said support as said stem moves about its pivot, and connections between said reciprocable member and said shaft arranged to cause the rotation of said shaft upon the longitudinal movement of said reciprocable member.

2. A gage for liquid containing tanks, comprising a hollow tube adapted to be secured to the tank wall, a longitudinal spindle journaled in said tube, an indicating device carried by said spindle, a reciprocable member carried by said tube, a stem pivoted to said tube upon a substantially horizontal axis, said axis being transverse to said spindle, means connecting said stem and reciprocable member whereby said reciprocable member will be moved along said tube as said stem is swung, means for rotating said spindle upon the movement of said reciprocable member, and a float carried by said stem.

3. A gage for liquid containing tanks, comprising a hollow tube adapted to be secured in the tank wall and having a longitudinal slot in its side, a longitudinal spindle journaled in said tube, an indicating device carried by said spindle, a reciprocable member mounted in said slot and arranged to be guided by the edges thereof, a stem pivoted to said tube upon a substantially horizontal axis, means connecting said reciprocable member and stem whereby said member will be moved along said slot as said stem is swung, means for rotating said spindle upon the movement of said reciprocable member, and a float carried by said stem.

4. A gage for liquid containing tanks, comprising a hollow tube adapted to be secured to the tank wall and having a slot in its side, a longitudinal spindle journaled in said tube, a drum carried by said spindle opposite said slot and also having a slot in its wall, the slots in said tube and drum being arranged at an angle to each other, a reciprocable member located in said first slot, the sides of said reciprocable member being formed to embrace the edges of said first slot, a finger carried by said reciprocable member and projecting into said second slot, a stem pivoted to said tube upon a substantially horizontal axis, a laterally extending lever carried by said stem, a link connecting said lever with said reciprocable member, a float carried by said stem, and an indicating device associated with said spindle and arranged to exhibit the position thereof.

5. A gage for liquid containing tanks, comprising a hollow tube adapted to be secured to the tank wall, a longitudinal shaft journaled in said tube, a shouldered disk rigidly secured to said shaft, an abutment member carried by the tube adjacent to said disk and adapted to arrest the rotation thereof, a stem pivoted to said tube upon an axis transverse to said shaft, a float carried by said stem, operative connections between said stem and shaft whereby said shaft will be rotated upon the swinging of said stem, and an indicating device connected to said shaft.

6. A gage for liquid containing tanks, comprising a hollow tube adapted to be secured to the tank wall and having a longitudinal slot in its side, a spindle journaled in said tube, a cylindrical drum carried by said spindle adjacent to said slot and having a slot in its wall, said slots being arranged at an angle to each other, a reciprocable member located in said first slot and having grooves at its sides engaging the edges thereof, a finger upon the interior of said reciprocable member and projecting into said second slot, a float in said tank, means connecting said float and said reciprocable member whereby said member will be shifted along said tube upon changes in position of said float, and an indicating device operatively connected to said spindle.

7. In a gage for liquid containing tanks, the combination, with a neck adapted to be attached to the tank wall, of an elongated cylindrical tube having an external diameter materially less than the internal diameter of said neck, a movable member in said tube, a float carried by the inner end of said tube, operative connections between said float and said movable member whereby said member will be actuated upon a movement of said float, a head adapted to be attached to said tube and having an indicating device therein adapted to be operated by said movable member, and a collar of thin ductile metal adapted to be secured to said tube and to be attached to said neck.

8. In a gage for liquid containing tanks, a neck adapted for attachment to the tank wall, an elongated cylindrical tube having an external diameter less than the internal diameter of said neck and arranged to traverse the same, an indicator operating device extending through said tube, actuating mechanism adjacent to one end of said tube and connected to said operating device, a float, means connecting said float to said mechanism so as to operate the same upon changes in the height of said float, a collar stamped from thin metal and having an aperture snugly receiving said tube and of a size to be secured to said neck, said collar being secured to said tube at a point intermediate the ends thereof, and an indicating device carried at the outer end of said tube.

9. A gage for liquid containing tanks, comprising an elongated tubular neck, a flange at one end of said neck and adapted to be secured to a vertical wall of the tank, a hollow tube adapted to be secured in the outer end of said neck and to project inside of said tank, a rotatable member journaled in said tube, a dial at the end of said tube, indicating devices connected to said rotatable member and coöperating with said dial, a float within said tank, and operative connections between said float and rotatable member whereby said member will be rotated upon an up and down movement of said float.

10. A gage for liquid containing tanks, comprising an elongated tubular neck, an external flange at one end of said neck and adapted to be secured to the wall of a tank, an internal flange at the other end of said neck, a tube adapted to traverse said neck, a collar carried by said tube and adapted to engage said last flange, a nut carried by said neck and adapted to press said collar against said flange, a transparent closure for the outer end of said tube, a rotatable spindle inside said tube, indicating devices carried by said spindle inside said closure, a packing box in said tube and through which said spindle passes, a float carried by the inner end of said tube, and operative connection between said float and spindle.

11. A gage for liquid containing tanks, comprising a hollow tube adapted to be secured in the tank wall, a longitudinal spindle journaled in said tube, a hollow head at the outer end of said tube, indicating devices in said head and operatively connected to said spindle, a float within said tank operatively connected to said spindle whereby said spindle will be rotated upon an up and down movement of said float, a packing box in said tube and having a cavity therein through which said spindle passes, and a viscous packing substance in said cavity and surrounding said spindle, said substance being insoluble in the liquid in the tank.

In testimony whereof, I hereunto affix my signature in the presence of two witnesses.

PERRY E. TANNER.

Witnesses:
BRENNAN B. WEST,
HAROLD E. SMITH.